United States Patent [19]

Buckley

[11] Patent Number: 4,842,632

[45] Date of Patent: Jun. 27, 1989

[54] METHOD OF MAKING MULTIFOCAL LENS BLANKS

[75] Inventor: Milford L. Buckley, Horseheads, N.Y.

[73] Assignee: Corning Glass Works, Corning, N.Y.

[21] Appl. No.: 116,152

[22] Filed: Nov. 3, 1987

[51] Int. Cl.$^4$ ............................................. C03B 11/08
[52] U.S. Cl. ...................................... 65/38; 65/30.11; 65/39
[58] Field of Search ........................... 65/38, 39, 30.11

[56] References Cited

U.S. PATENT DOCUMENTS

| | | | |
|---|---|---|---|
| 865,363 | 9/1907 | Dieckmann | 65/39 |
| 1,190,242 | 7/1916 | Hill | 65/38 |
| 1,436,217 | 11/1922 | Tillyer | 65/39 |
| 1,596,397 | 8/1926 | Bugbee, Jr. | 65/39 |
| 1,734,428 | 11/1929 | Haering | 65/39 |
| 2,640,299 | 6/1953 | Sheard et al. | 65/38 |
| 3,966,311 | 6/1976 | Korn et al. | 65/38 |
| 4,190,451 | 2/1980 | Hares et al. | 65/30.11 |

Primary Examiner—Robert L. Lindsay
Attorney, Agent, or Firm—Clinton S. Janes, Jr.

[57] ABSTRACT

There is disclosed an improved method of assembling and fusing the segment and major elements of a multifocal lens blank that employs glass spacer members to space the segment from the major element and allow the segment to progressively slump into sealing relationship with the major as fusion temperature is approached. The glass spacer member has a softening point that is lower than that of the major element glass and may approximate that of the segment glass.

8 Claims, 1 Drawing Sheet

METHOD OF MAKING MULTIFOCAL LENS BLANKS

INTRODUCTION

This invention relates to the production of fused glass blanks from which ophthalmic multifocal lenses are formed. It is particularly concerned with the assembly and fusing together of the segment and major elements to form a multifocal lens blank.

As used herein, the term "major" refers to the low power portion of an ophthalmic lens or lens blank which provides distance correction. It is also sometimes referred to as the "crown major", or "far vision" portion. The term "lower segment", or, if round, the "button", refers to the smaller, higher power portion that is inserted, or inlaid, to provide near vision correction, as for reading. It is also sometimes referred to as the "addition".

Assemblies having "cut-off" types of reading segments, that is other than round, are generally referred to as "straight-top" or "flat-top", "curve-top", and "p-style" or "panoscopic". These cut-off types require a second segment portion. This is variously referred to as the "upper segment", the "crown upper", or, in the case of the p-style, the "crown carrier".

The major and the upper segment are molded from a "crown glass". Typically, such a glass, when properly annealed, has a refractive index ($n_D$) of 1.5231. This is an industry standard, and the glass is commonly referred to as a "standard crown". It may be white (clear) or tinted, and have an alkali-lime-silicate or alkali-zinc-silicate-type composition. A corresponding photochromic, crown-type glass is typically a lower expansion, borosilicate glass, and is commonly referred to as a "photochromic crown".

Lower, or near vision, segments are molded from a series of glasses. Each glass in the series has different optical properties. However, all have very similar physical properties, such as softness and annealing temperatures and linear coefficient of thermal expansion. This provides varying degrees of optical correction to choose from, while providing glasses for compatible fusing with crown glasses and/or with each other.

These series of glasses are intentionally designed to have softening points that are 30° to 45° C. lower than the softening points of the major and upper or carrier crown glasses with which they are intended to be fused. The optical properties of the lower segment glasses are designed to include a series of refractive indices having ratios of refractive power. The most commonly used indices ($n_D$) are 1.588, 1.617, 1.653 and 1.701. Those indices were chosen to attain specific reading or "addition" powers of focal lengths in conjunction with a common curvature. Thus, high "additions", or short focal lengths, may be provided through thin sections. Thereby, use of thick reading segments in the finished prescription can be minimized.

The major crowns are commonly molded with front or convex curvature, sometimes plano, in series of powers standard in the industry. These are normally referred to as "base curves". The majors are prepared with a variety of spherically ground and polished cavities known as "countersinks". The curve geometry of these countersinks may be near plano, concave, or meniscus. A series of common countersinks may be formed in majors having a series of base curves. This accommodates different segment indices to yield the same addition in each finished lens. Alternatively, the countersink curvature may be varied over a series of base curves with the same segment index to produce common "additions". These countersinks are prepared in the majors for receiving and fusing of the segments.

A segment is prepared having a ground and polished curvature. That curvature is nearly the same as, but reversed to, that of the major crown countersink in which it will be fused. "Cut-off" type segments are unlike round, or "button", segments in that they require preparation of edges for assembly by butt-fusing of a crown upper and lower reading segment. This is followed by grinding and polishing of one face for assembly with a major crown countersink.

In forming a multifocal lens blank, the crown major and the segment portion(s) are customarily molded separately. Where two segment portions are required, they may be fused together into an integral segment unit before assembly. The segment and crown major are then assembled and subjected to a fusion heat treatment to form a unitary blank. The blank is then ground and polished in accordance with a predetermined prescription for the specific base curve and reading segment size.

It is time honored practice, in assembling the segment and major elements for fusion, to insert spacers between the elements at one side of the segment. Such spacers are dipped in a fast dry sodium silicate-type glue for holding the assembly. Customarily, pins, such as Nichrome wire pins, are employed. However, some technicians remove the pins after application of ceramic paste dots as an alternative before fusing.

The spacers or support paste dots allow the button or segment assembly to gradually slump down into sealing relation to the countersink while forcing air from between the elements. This accommodates outgassing and enables producing a seal free from trapped air lakes and air bubbles. The portion of the unitary blank occupied by the spacers is later ground away as the blank is finished to form the semi-finished lens. This is sometimes referred to as "top-side finishing to segment size".

This system has long been accepted in the production of standard fused crown multifocals in spite of various problems that arise. These include incomplete fusion and glass spalling. There is also need for careful temperature adjustment and control, with consequent production loss, particularly in start-up to obtain adequate fuse-out for the reading segment size intended after top-side finishing without use of excessive temperatures.

Incomplete fusion occurs in the vicinity of the spacers and paste dots, and is commonly referred to as "short fuseout". It simply means the button or upper crown segment glass fails to soften enough to slump around the spacer and form a complete "fuse-out" seal. To compensate for this, the button and segment moldings must be made sufficiently larger than would otherwise be necessary so that the unfused zones may be removed during grinding. Alternatively, the fusion cycle may be adjusted, but this is time consuming and may be limited by distortion of the crown major countersink and out-gassing or reboil of the softer reading segment glasses.

Glass spalling may occur at the glass-pin seal due to mismatch of thermal coefficients of expansion between metal and glass after fusion and annealing. This problem becomes particularly serious if the blank must be stored for short times such as days or shipped as "fused roughs" before "top-side" finishing the lens.

The advent of photochromic glasses has seriously aggravated the situation, particularly the fuseout problem.

Photochromic glass moldings are furnished for fused multifocal use in an incomplete state of thermal nucleation. Such potential photochromic glass must be heat cycled at elevated temperatures near or at the glass softening point to complete nucleation of the color sites that impart photochromism. Photochromic properties, including color, transmittance values, degree of darkening and rates of darkening and fading, are critically dependent on the nature of the thermal treatment. The glass may also develop haze with excessive thermal treatment. Hence, the time-temperature rates for both heating and cooling, as well as the peak temperature, and hold time, are considerably more critical for photochromic glass than for non-photochromic glass. Therefore, the fusing cycle must be tightly controlled to minimize haze and avoid variable photochromic properties. Hence, if the fusion cycle is not held constant within narrow limitations, the photochromic characteristics of a glass will be unacceptable. This precludes reliance on adjustment of the fusion cycle to minimize incomplete fusion.

The cost of photochromic glass ingredients enhances the desire to avoid losses. Further, such glasses may undergo reduction, and consequent discoloration, from either metal or paste spacers and paste dot supports.

PURPOSES OF THE INVENTION

A basic purpose is to provide an improved method of assembling and fusing together the elements of a multifocal lens blank that mitigates prior problems.

Another purpose is to provide an assembly and fusion method for multifocal lens blanks that is more compatible with the constraints imposed by photochromic glasses.

A specific purpose is to provide an assembly and fusion method for multifocal lens blanks that minimizes the degree of incomplete fusion that occurs in a segment-major seal.

A further specific purpose is to provide an assembly and fusion method for a multifocal lens blank that permits use of a smaller size segment molding than heretofore required to yield a predetermined reading segment size in a semi-finished lens.

A still further specific purpose is to provide an assembly and fusion method for multifocal lens blanks wherein spacers of specific lengths are automatically severed from an elongated fiber and inserted between major and segment elements during assembly.

Another specific purpose is to provide such a method that avoids the presence of foreign materials in the seal.

A further specific purpose is to provide a method of assembling and fusing a segment in a photochromic major element that permits producing multifocal lens blanks having reproducible photochromic properties.

PRIOR LITERATURE

U.S. Pat. No. 865,363 (Dieckmann) describes a method of making bifocal lenses wherein the separate elements are supported in spaced apart relation by an independent member referred to as a foreign body. A small piece of steel is suggested as the foreign body.

U.S. Pat. No. 1,436,217 (Tillyer) describes a process of making multifocal lenses wherein the component members are surfaced independently prior to fusion. An interposed spacing member, not further described, may be inserted between the members during fusion.

U.S. Pat. No. 1,734,428 (Haering) describes a method particularly adapted to making trifocal lenses. The segment and the major blank may be spaced during fusion by means of a wire or other suitable spacing member.

SUMMARY OF THE INVENTION

My invention resides in a method of assembling and fusing the segment and major elements of a multifocal lens which comprises the steps of:

(a) resting the segment on a spacing member in a countersink on the major element to cause one edge of the segment to be in spaced relation thereto, said spacing member being formed from a glass that will fuse compatibly with the glass of the major element, but has a lower softening point than the glass of the major element; and then (b) heating that so-formed assembly of segment and major glass elements and said glass spacing member to the temperature for fusing the segment and major elements together, the lower softening point of said glass spacing member allowing the segment to gradually slump into the countersink as the fusion temperature is approached.

In one embodiment, the glass of the spacing member is about 30°–45° C. softer than the glass of the major element. In another embodiment, the spacing member is produced from the same glass as the segment. In another embodiment, the glass spacing member may have a stop that controls the distance to which it is inserted between the elements.

DESCRIPTION OF THE INVENTION

Figure 1:
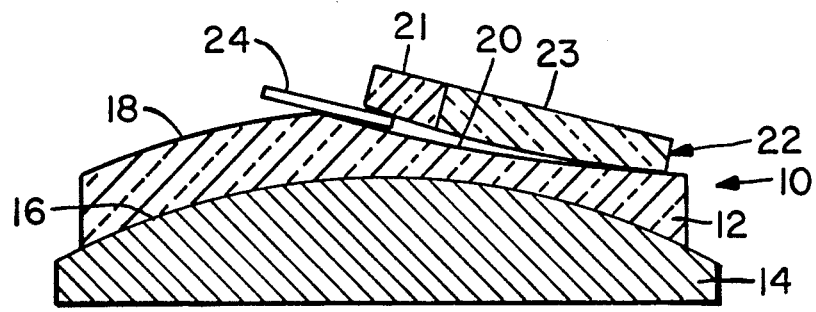
FIG. 1 is a side view of an assembly in accordance with the invention.
Figure 2:
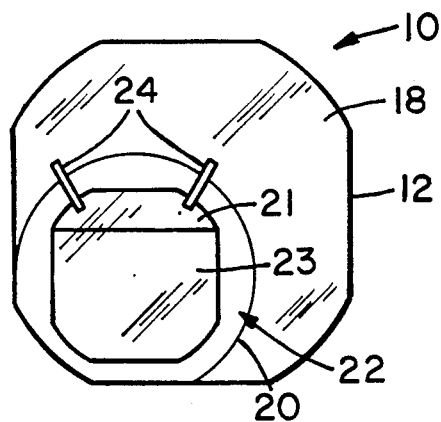
FIG. 2 is a top plan view of the assembly of FIG. 1.

FIGS. 1 and 2 illustrate a typical assembly 10 such as has been employed for decades in producing fused multifocal lens blanks. A major element 12 is placed on a support 14. The support has a convex curvature corresponding to the concave curvature of the undersurface 16 of major element 12.

Major element 12 has a countersink 20, formed in its upper surface 18 to receive fused segment assembly 22 composed of upper crown 21 and lower barium segment 23 portions. The edge of lower segment 23 rests adjacent the lower edge of the countersink. This is at the six o'clock position, having reference to FIG. 2. The opposite edge of upper segment 21 is spaced from countersink 20 by two spacers 24 inserted between the two elements.

Figure 3:
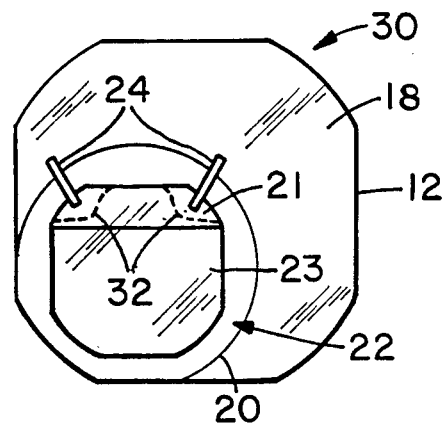
FIG. 3 is a top plan view of a prior art fused blank illustrating the problem of incomplete fusion.

Traditionally, spacers 24 have been metal pins, usually Nichrome wire pins, inserted at the 10 and 2 o'clock positions, again having reference to FIG. 2. The function of such spacer members is to allow segment assembly 22 to progressively slump into sealing relation with major element 12. This forms a unitary blank 30 as shown in FIG. 3. As explained earlier, the usual result with prior spacers is an unsealed zone 32 around each spacer, commonly termed a "short fuseout". These zones are indicated by broken lines in FIG. 3 which shows a typical prior art blank.

The plan views of FIGS. 2 and 3 represent lens blank assemblies for production of a left eye lens. It will be appreciated that a corresponding assembly for a right eye lens would be a mirror image.

The present invention is a simple, but very effective, modification of the prior art as heretofore described. The assembly may be unchanged, except that spacer members 24 are glassy members, rather than metal wires or paste dots. A glass somewhat softer than the glass of major element 12, is selected. Preferably, the glass selected has a softening point approximating that of the lower segment member glass. This permits the spacers 24 to soften and fuse along with the segment. Further, it minimizes, and may eliminate, the "short fuseout" zones 32 in a fused multifocal blank.

Figure 4:
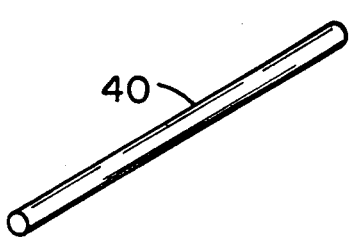
FIGS. 4 and 5 are perspective views of two forms of glass spacers adapted to use in the inventive method.

The glassy spacer member of the invention may be a length of drawn glass cane 40 as shown in FIG. 4. Typically, glass cane 40 may be ¼ mm in diameter and 6 mm in length. Such dimensions are not critical, however, and may be varied at the discretion of one assembling and fusing the lens blank.

Alternatively, if desired, glass cane 40 may have a deformation, such as an enlargement or a hump, formed at a selected point along its length. Such deformation can serve as a stop that permits glass cane 40 to be inserted a standard distance under segment assembly 22 in each assembly. The deformation may be formed at equally spaced intervals as a glass cane is drawn from a melt.

Figure 5:
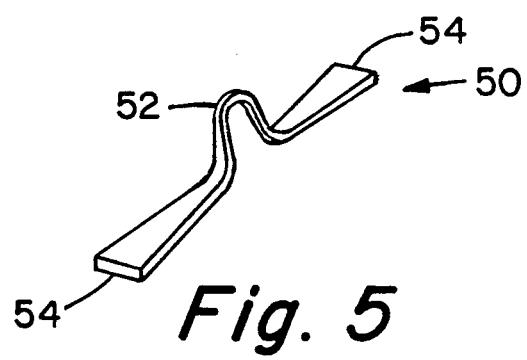

FIG. 5 illustrates a glass spacer member 50 having a hump 52 formed midway of its length. Also, ends 54 of the member are flattened to facilitate handling. Again, member 50 may be a length of cane that has been flattened and deformed as drawn, or in a reheat operation.

It is a particular feature of the invention that glass spacer members 40 or 50 may be initially drawn in the form of elongated cane or fiber. Such elongated glass cane or fiber may be automatically fed through a gun, or similar device, that serially severs predetermined lengths, and inserts such severed lengths between segment and major elements. In this manner, the assembly can be automated, thereby avoiding the risk of human error and contamination in handling.

SPECIFIC EXAMPLES

The invention is further described with reference to specific examples of assembly and fusion operations employing typical commercial glasses.

TABLE I sets forth the compositions, in percent by weight on an oxide basis, and relevant properties of, two white crown and one photochromic crown glasses. These are typical of glasses used in producing major and upper segment elements.

TABLE II sets forth, in like manner, compositions and properties of two typical fusible, lower segment glasses, one designed for use in standard crown glass lens, the other for use in a photochromic crown glass lens.

TABLE I

|  | 1 | 2 | 3 |
|---|---|---|---|
| $SiO_2$ | 67.8 | 62.1 | 56.3 |
| $B_2O_3$ | — | 1.0 | 18.2 |
| $Al_2O_3$ | 2.0 | 2.8 | 6.2 |
| ZnO | 3.8 | 1.9 | — |
| MgO | — | 2.9 | — |
| CaO | 8.3 | — | — |
| $Na_2O$ | 8.2 | 8.5 | 5.5 |
| $K_2O$ | 9.3 | 9.5 | 5.7 |
| $Li_2O$ | — | — | 1.8 |
| $ZrO_2$ | — | — | 5.0 |
| $TiO_2$ | 0.4 | 0.7 | 2.3 |
| $Sb_2O_3$ | 0.4 | 0.4 | — |
| $As_2O_3$ | 0.1 | 0.2 | — |
| Soft. Point (°C.) | 726 | 739 | 662 |
| Coef. of exp. ($\times 10^{-7}/°C.$) 0–300° C. | 94 | 93.6 | 64.8 |

NOTE: In addition, the photochromic glass of Example 3 contains minor amounts of silver, CuO, Cl and Br to impart photochromic properties. Such glasses are described in detail in U.S. Pat. No. 4,190,451 (Hares et al.)

TABLE II

|  | 4 | 5 |
|---|---|---|
| $SiO_2$ | 41 | 35.6 |
| $B_2O_3$ | 4 | 5.9 |
| PbO | 14 | 44.4 |
| BaO | 20 | 5.0 |
| CaO | 5 | — |
| $Na_2O$ | 6 | 1.5 |
| $ZrO_2$ | 7 | — |
| $TiO_2$ | 3 | 1.2 |
| $Al_2O_3$ | 6 | — |
| $Li_2O$ | — | 0.15 |
| $As_2O_3$ | — | 0.15 |
| $Sb_2O_3$ | — | 0.10 |
| Soft. Point (°C.) | 683 | 628 |
| Coef. of Exp. ($\times 10^{-7}/°C.$) | 92 | 62 |

In one exemplary operation, the major and upper segment elements were molded from a white crown glass having the composition and properties shown in TABLE I as Example 1. The lower segment was molded from a barium flint glass having the composition and properties shown in Example 4 of TABLE II. The glass spacers employed were 6 mm lengths of ¼ mm cane drawn from a melt of the glass of Example 4. The components were arranged in a manner corresponding to that illustrated in FIGS. 1 and 2. The assembly was heated to about 730° C., held at that temperature for about 15 minutes, and then cooled. In another exemplary operation, a corresponding assembly was employed. However, in this case, the major and upper segment were molded from the photochromic crown glass shown in TABLE I as Example 3. The lower segment was molded from the barium flint glass shown as Example 5 in TABLE II. This is a glass formulated to permit fusing with the photochromic glass of Example 3. In turn, the glass spacers were 6 mm lengths of ¼ mm cane drawn from a melt of the glass of Example 5. The assembly was heated to a temperature of about 665° C., held for 10 to 15 minutes, and cooled.

While particular embodiments of the invention have been described and illustrated, it will be appreciated that the invention is subject to numerous obvious variations. For example, countersink 20 might have a convex surface rather than a concave depression. Also, spacers 24 might be at other positions such as the 11 and one o'clock positions for example. Further, three or more glass spacers may be used in some operations, for example in the assembly and fusion of a trifocal lens blank.

I claim:

1. A method of assembling and fusing the segment and major glass elements of a multifocal lens, wherein the segment element consists of a crown glass portion and a barium glass portion, which comprises the steps of:
(a) placing the segment element in a countersink on the major element with an edge of the barium glass portion of the segment element resting against the countersink, the remainder of the segment element being maintained in spaced relation to the countersink by a spacing member inserted between the opposed upper edge of the crown glass portion of the segment element and the countersink, said spacing member being formed from a glass that will fuse compatibly with the glass of the major element, but has a lower softening point than the glass of the major element; and then
(b) heating that so-formed assembly of segment and major glass elements and said glass spacing member to the temperature for fusing the segment and major elements together, the lower softening point of said glass spacing member allowing the segment to gradually slump into the countersink as the fusion temperature is approached.

2. A method in accordance with claim 1 wherein the softening point of the glass spacing member is about 30°–45° C. lower than that of the major element glass.

3. A method in accordance with claim 1 wherein the softening point of the glass spacing member approximates that of the barium glass portion of the segment element.

4. A method in accordance with claim 1 wherein the major element is formed from a standard white or tinted crown glass.

5. A method in accordance with claim 1 wherein the major element is formed from a photochromic glass.

6. A method in accordance with claim 1 wherein the spacing member is a length of glass cane inserted between the elements.

7. A method in accordance with claim 1 wherein the spacing member is inserted between the elements and is provided with a stop member to control the extent of insertion.

8. A method in accordance with claim 1 wherein the spacing member and the barium glass portion of the segment element are formed from the same glass.

* * * * *